United States Patent
Isshiki

(10) Patent No.: US 6,918,706 B2
(45) Date of Patent: Jul. 19, 2005

(54) REDUCING A DIFFERENCE IN PICTURE QUALITY BETWEEN DETERIORATED AND NON-DETERIORATED IMAGES USING A PRINTING APPARATUS

(75) Inventor: Naohiro Isshiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/693,878

(22) Filed: Oct. 28, 2003

(65) Prior Publication Data

US 2004/0083916 A1 May 6, 2004

(30) Foreign Application Priority Data

Oct. 31, 2002 (JP) .......................................... 2002-318431

(51) Int. Cl.⁷ .............................. B41J 11/44; B41C 1/14
(52) U.S. Cl. ...................................... 400/76; 101/128.4
(58) Field of Search ........................ 400/76; 101/128.4; 358/1.2, 1.9; 347/251; 710/16

(56) References Cited

U.S. PATENT DOCUMENTS

| | | | | |
|---|---|---|---|---|
| 5,111,514 A | * | 5/1992 | Ohta ........................... | 382/177 |
| 5,228,118 A | * | 7/1993 | Sasaki ........................ | 358/1.13 |
| 5,485,213 A | * | 1/1996 | Murashita et al. ..... | 375/240.12 |
| 5,664,195 A | * | 9/1997 | Chatterji ..................... | 717/178 |
| 5,668,992 A | * | 9/1997 | Hammer et al. ................ | 713/1 |
| 5,805,826 A | * | 9/1998 | Kim et al. ................... | 709/247 |
| 5,835,122 A | | 11/1998 | Oki et al. .................... | 347/251 |
| 5,982,391 A | * | 11/1999 | Oki ............................. | 345/501 |
| 6,172,765 B1 | * | 1/2001 | Kawamoto ................... | 358/1.2 |
| 6,317,802 B1 | * | 11/2001 | Inamine ....................... | 710/64 |
| 6,728,412 B1 | * | 4/2004 | Vasylyev ..................... | 382/242 |

FOREIGN PATENT DOCUMENTS

JP 7-137355 5/1995 .............. B41J/5/30

* cited by examiner

*Primary Examiner*—Andrew H. Hirshfeld
*Assistant Examiner*—Wasseem H. Hamdan
(74) *Attorney, Agent, or Firm*—Fitzpatrick, Cella, Harper & Scinto

(57) ABSTRACT

A difference of picture quality between a foreground image and a background image is reduced and a good print result in which a boundary between the foreground image and the background image is inconspicuous is obtained. A printing apparatus for compressing raster image information which is formed in accordance with inputted print information, using the compressed image as a background image, and drawing a foreground image thereon. After the foreground image was drawn on a RAM 2, a degree of image deterioration due to compression of the compressed background image is detected and a compressing process which causes the image deterioration of the degree similar to the detected image deterioration is performed to the whole image.

12 Claims, 9 Drawing Sheets

FIG. 8

STORING MEDIUM SUCH AS FD, CD-ROM, ETC.

| DIRECTORY INFORMATION |
|---|
| 1ST DATA PROCESSING PROGRAM<br>PROGRAM CODE GROUP CORRESPONDING TO STEPS IN FLOWCHART SHOWN IN FIG. 3 |
| 2ND DATA PROCESSING PROGRAM<br>PROGRAM CODE GROUP CORRESPONDING TO STEPS IN FLOWCHART SHOWN IN FIG. 4 |
| 3RD DATA PROCESSING PROGRAM<br>PROGRAM CODE GROUP CORRESPONDING TO STEPS IN FLOWCHART SHOWN IN FIG. 5 |

MEMORY MAP IN STORING MEDIUM

REDUCING A DIFFERENCE IN PICTURE QUALITY BETWEEN DETERIORATED AND NON-DETERIORATED IMAGES USING A PRINTING APPARATUS

BACKGROUND OF THE INVENTION

1. Field of the Invention

The invention relates to a printing apparatus which reduces a difference of picture quality between a deteriorated image and a non-deteriorated image to obtain a print result in which a boundary between the deteriorated image and the non-deteriorated image is inconspicuous.

2. Related Background Art

In recent years, an information processing system has been generalized and widely used. In such a situation, many electronic documents are formed on the information processing system, there is a tendency such that an output request to a color printing apparatus is increasing, and a high-speed color printing apparatus of a low cost is demanded.

Hitherto, in a print system for interpreting a page description language (PDL) transmitted from a host computer or a print server and forming a raster image, generally, the PDL is interpreted, thereafter, a display list (DL) as an intermediate language is formed, and raster image conversion (rendering) from the DL is executed.

At this time, since a size of the PDL data is not limited, there is a case where a size of DL which is formed from the PDL data is very large. If the DL is complicated and its size increases, a work area which is used by a renderer for rendering the DL also increases.

However, since an amount of memory which is provided in the printing apparatus is limited and there is a limitation of costs, in many cases, there is not a memory capacity enough to store the DL.

Therefore, a size of area to store the DL and a size of work area which can be used by the renderer are limited and there is a limitation such that a DL of a predetermined size or more cannot be processed.

A process called a fallback is executed to avoid such a limitation. According to the fallback, when the size of DL exceeds the predetermined size or if it is known that the size of work area for processing the DL exceeds the predetermined size, the DL formed so far is rendered once so as to form a raster image and the DL formed so far is cleared once.

The raster image is added again as a background image of a drawing area to a part of the DL.

Ordinarily, since the background image is compressed, a size of DL which is added is smaller than the original DL size. Therefore, by forming the residual DL into the empty area, the DL of a large size can be processed in the limited memory space. Since the work area of the renderer is also cleared when the rendering is finished at the time of fallback, the size limitation of the work area can be also avoided and the printing apparatus of a low cost can be provided. For example, refer to Japanese Patent Application Laid-Open No. H7-137355.

Although the raster image formed in the step of executing the fallback process as mentioned above is compressed and added to a DL list, the compression image which is formed at this time has to be also enclosed in the predetermined size.

Particularly, since the size of raster image which is formed upon rendering in the case of a color image is very large and, in many cases, the compression image cannot be enclosed in the predetermined size at the time of reversible compression, irreversible compression is ordinarily used.

However, if the irreversible compression is used, the compressed image deteriorates. There is, consequently, a problem such that if the deteriorated compression image is used as a background image and a residual foreground image is drawn thereon, a difference of picture quality is caused between the foreground image and the background image, so that its boundary becomes conspicuous.

FIG. 9 is a diagram for explaining an example of a print result which was irreversible-compression processed in the conventional printing apparatus.

In FIG. 9, reference numeral 301 denotes a print result. For example, the side over a position 310 corresponds to the background image and a side under the position 310 corresponds to the foreground image. There is a problem such that since a difference of the picture quality is large, only a print result of low quality in which a boundary between the background image and the foreground image is clearly conspicuous can be obtained due to a difference of the picture quality between the foreground image and the background image.

SUMMARY OF THE INVENTION

The invention is made to solve the above problems and it is an object of the invention to provide a printing apparatus which can reduce a difference of picture quality between a deteriorated image and a non-deteriorated image and obtain a good print result in which a boundary between the deteriorated image and the non-deteriorated image is inconspicuous.

To accomplish the above object, according to the invention, there is provided a printing apparatus comprising: a discriminating unit for discriminating whether an image is an image including a deteriorated image or not; a processing unit for deteriorating the whole image if it is determined by the discriminating unit that the image is the image including the deteriorated image; and a printing unit for printing the image processed by the processing unit.

BRIEF DESCRIPTION OF THE DRAWINGS

FIG. 8 is a diagram for explaining a memory map in a storing medium for storing various data processing programs which can be read out by the printing apparatus according to the invention.

DETAILED DESCRIPTION OF THE PREFERRED EMBODIMENTS

Prior to explaining a construction of an embodiment, a construction of a laser beam printer which is suitable to apply the embodiment will be described with reference to FIG. 1. A printer to which the embodiment is applied is not limited to the laser beam printer but, naturally, a printer (ink jet printer) of another printing system can be used.

Figure 1:
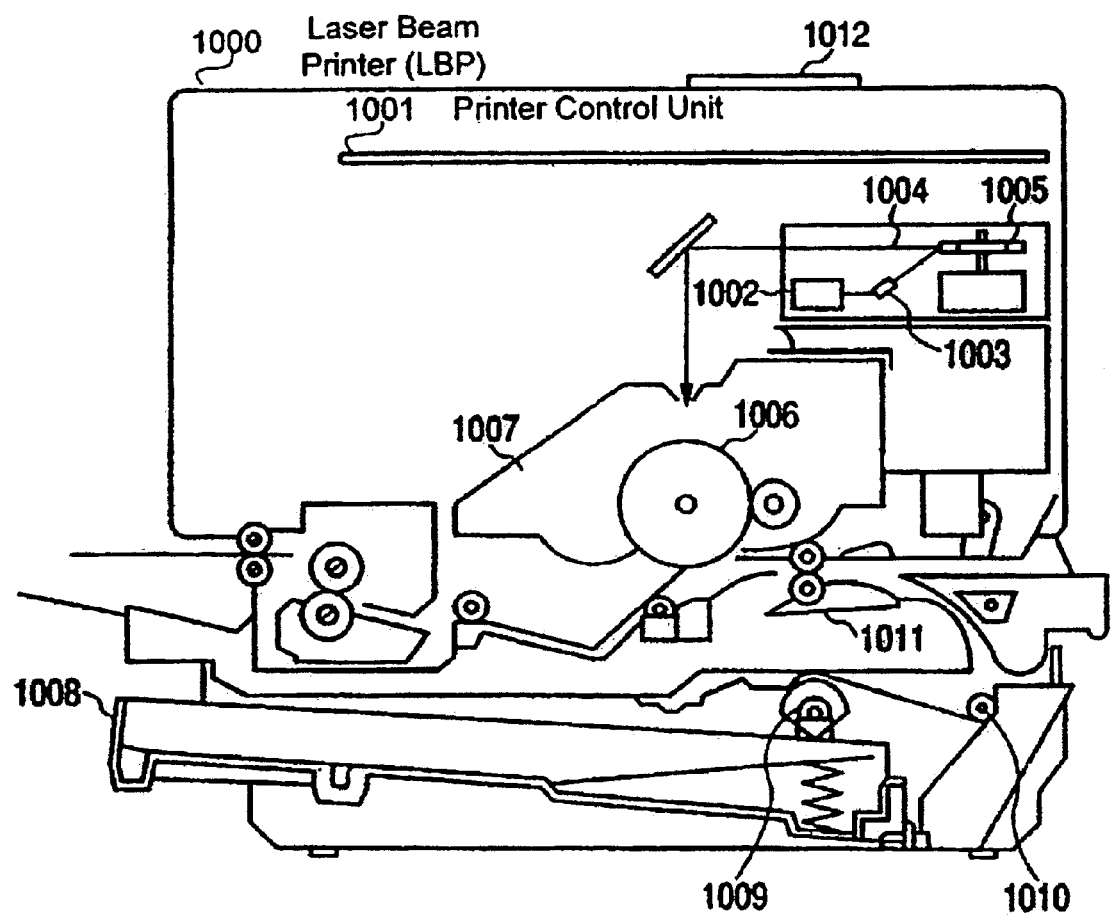
FIG. 1 is a cross sectional view showing a construction of an output apparatus to which the invention can be applied.

FIG. 1 is a cross sectional view showing a construction of an output apparatus to which the invention can be applied and shows a case of, for example, the laser beam printer (LBP).

In FIG. 1, reference numeral 1000 denotes an LBP main body (LBP) which inputs and stores print information (character codes, etc.), form information, a macro command, and the like which are supplied from an external information source such as a host computer or the like connected to an outside via a network or connected by a direct interface, forms a corresponding character pattern, form pattern, or the like in accordance with those information, and forms an image onto recording paper or the like as a recording medium.

Reference numeral 1012 denotes an operation panel on which switches for operation, an LED display, and the like are arranged. Reference numeral 1001 denotes a printer control unit for controlling the whole LBP 1000 and analyzing character information or the like which is supplied from an external network or the like.

The printer control unit 1001 converts mainly the character information into a video signal of the corresponding character pattern and outputs it to a laser driver 1002. The laser driver 1002 is a circuit for driving a semiconductor laser 1003 and switching an on/off operation of a laser beam 1004 which is emitted from the semiconductor laser 1003 in accordance with the inputted video signal. The laser beam 1004 is swung to the right and left by a rotary polygon mirror 1005 and scans and exposes an electrostatic drum 1006.

Thus, an electrostatic latent image of the character pattern is formed on the electrostatic drum 1006. The latent image is developed by a developing unit 1007 arranged around the electrostatic drum 1006 and, thereafter, transferred onto the recording paper.

A cut sheet is used as recording paper. The cut sheet recording paper is enclosed in a sheet cassette 1008 attached to the LBP 1000, fed into the apparatus by a paper feed roller 1009, a conveying roller 1010, and a conveying roller 1011, and supplied to the electrostatic drum 1006.

(First Embodiment)

Figure 2:
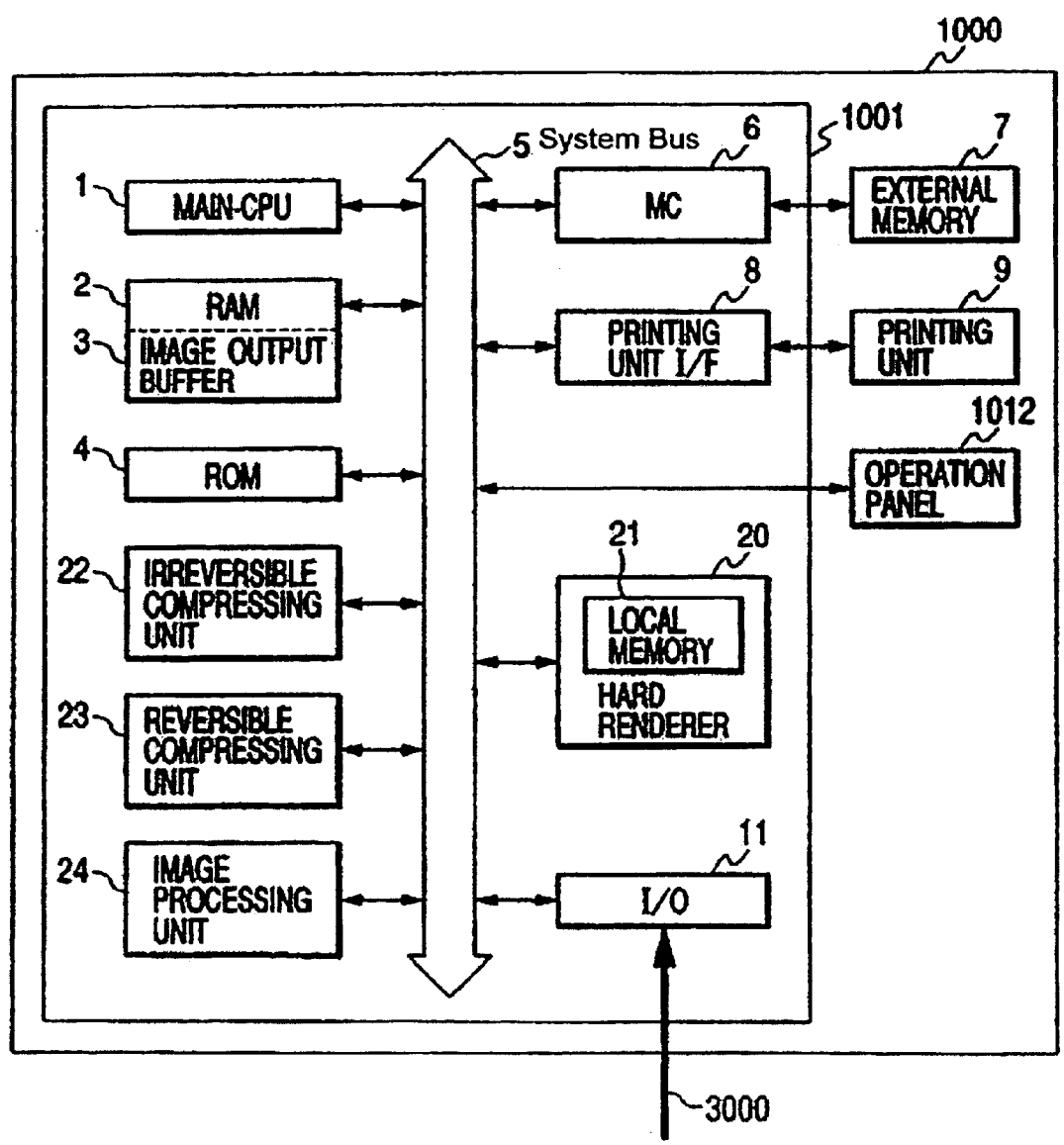
FIG. 2 is a block diagram for explaining a construction of a printer control system in a printing apparatus showing the first embodiment of the invention.

FIG. 2 is a block diagram for explaining a construction of a printer control system in a printing apparatus according to the first embodiment of the invention. In FIG. 2, the same component elements as those in FIG. 1 are designated by the same reference numerals.

In the printer control unit 1001 shown in FIG. 2, a main-CPU 1 is a CPU of the printer. The main-CPU 1 integratedly controls accesses to various devices which are connected to a system bus 5 on the basis of a control program stored in a ROM 4, a control program stored in an external memory 7, or the like and outputs an image signal as output information to a printing unit (printer engine) 9 connected via a printing unit interface 8.

The control programs for the main-CPU 1 as shown in flowcharts of FIGS. 3, 4, and 5, which will be explained hereinlater and data necessary for control of the LBP 1000 are stored in the ROM 4. The main-CPU 1 can communicate with an external apparatus such as a host computer or the like connected to an external network 3000 via an I/O 11.

Although the main-CPU 1 communicates with the host computer via the external network, naturally, it is possible to connect the main-CPU 1 to the host computer via the direct interface (not shown) and communicate.

Reference numeral 2 denotes a RAM which functions as a main memory, a work area, etc. of the main-CPU 1. The RAM 2 is constructed so that a memory capacity can be expanded by an option RAM which is connected to an expansion port (not shown).

The RAM 2 stores a PDL which is transmitted from the host computer and stores a DL which is formed on the basis of the PDL.

Reference numeral 3 denotes an image output buffer which is prepared on the RAM 2. A raster image and attribute bits which are formed by a hard renderer 20, which will be explained hereinlater, are recorded into the image output buffer 3 as a fallback buffer or an output buffer.

The compressed image stored in the image output buffer is decompressed by the CPU or a decompressing unit and transferred to the printing unit.

Reference numeral 6 denotes a memory controller (MC) for controlling an access to an external memory 7 such as a hard disk or the like. Reference numeral 20 denotes the hard renderer having a local memory 21 therein. The hard renderer 20 interprets a display list (DL) transferred to the local memory 21 or a DL in the RAM 2 as it is and forms the raster image and the corresponding attribute bits of each pixel of the raster image.

Each attribute bit which is formed here is constructed by three bit fields of total of four bits comprising: a color bit of one bit; a thin line bit of 1 bit; and object type bits of 2 bits.

The color bit shows whether the corresponding pixel is a pixel constructing a color object or a pixel constructing a black and white object. When the color bit is equal to "0", the pixel is the pixel constructing the color object. When it is equal to "1", the pixel is the pixel constructing the black and white object.

The thin line bit shows whether the corresponding pixel is a pixel constructing a thin line or not. When the thin line bit is equal to "1", the pixel is the pixel constructing the thin line.

The object type bits show which type of drawing object the corresponding pixel constructs. When the object type bits are equal to "01", the pixel is a pixel constructing a character object. When they are equal to "10", the pixel is a pixel constructing a graphics object. When they are equal to "11", the pixel is a pixel constructing an image object. When they are equal to "00", it means that the pixel does not construct any object.

An irreversible compressing unit 22 executes irreversible compression to the raster image and stores the compressed image into the image output buffer 3 on the RAM 2. The irreversible compressing unit according to the embodiment uses JPEG. According to JPEG, by changing a Q table which is used upon compression, a compression ratio of an image as a compression target can be changed. The higher the compression ratio is, the larger the image deterioration is.

Although Joint Photographic Experts Group (JPEG) is used as irreversible compression, naturally, the invention can be applied to any irreversible compressing method so long as the compression ration can be changed.

A reversible compressing unit 23 executes reversible compression to the attribute bit and stores the compressed image into the image output buffer 3. An image processing unit 24 executes one or a combination of an image process for characters, an image process for an image, an image process for graphics, an image process for a color image, an image process for a black and white image, and an image process for a thin line or a combination of them to the raster data on the basis of the attribute bit formed by the hard renderer 20.

In the printer control system constructed as mentioned above, embodiments of the invention will be described with reference to FIG. 3 and flowcharts of FIGS. 4 and 5.

The LBP 1000 has, for example, six kinds of Q tables which are set into JPEG of the irreversible compressing unit 22 when the raster image which is formed upon rendering, which will be explained hereinlater, is compressed. The Q tables have identifiers 1 to 6. Those identifiers are called Q table IDs for convenience of explanation. Each Q table has been set so that the larger the Q table ID is, the higher the compression ratio is. Therefore, the larger the Q table ID of Q table which is used is, the more the image deterioration is.

Although there are six kinds of Q tables here, naturally, the number of Q tables is not limited.

In the embodiment, according to compression results which are obtained by using the Q tables of the Q table ID1 to the Q table ID5, the image deterioration is inconspicuous at a glance. However, the Q table of the Q table ID6 has been designed so that the compression results of the most images can be enclosed in a fallback buffer or an image spool area, which will be explained hereinlater, and the image deterioration which is caused when such a Q table is used is very large.

Figure 9:
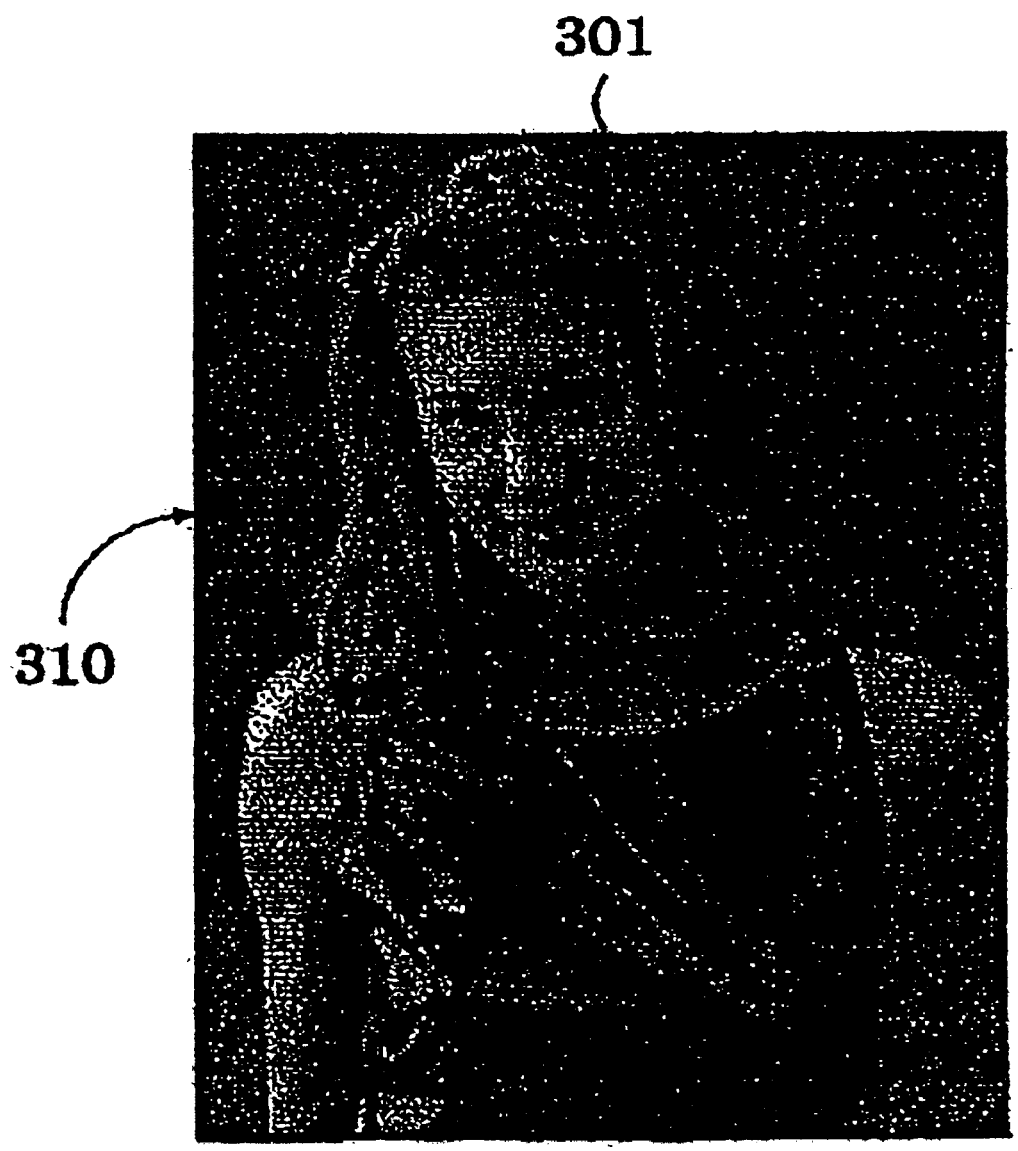
FIG. 9 is a diagram for explaining an example of a print result which was irreversible-compression processed in a conventional printing apparatus.

Therefore, if the compression image compressed by using the Q table of the Q table ID6 is used as a background image and a foreground image is drawn thereon upon fallback, the difference of the picture quality is very large and a boundary portion between them is very conspicuous as shown in FIG. 9.

In the embodiment, therefore, "6" is set into a variable QTH and only when the Q table of the Q table ID6 is used in the compression during the fallback of a PDL job printing process, which will be explained hereinlater, the fallback is generated again.

Figure 3:
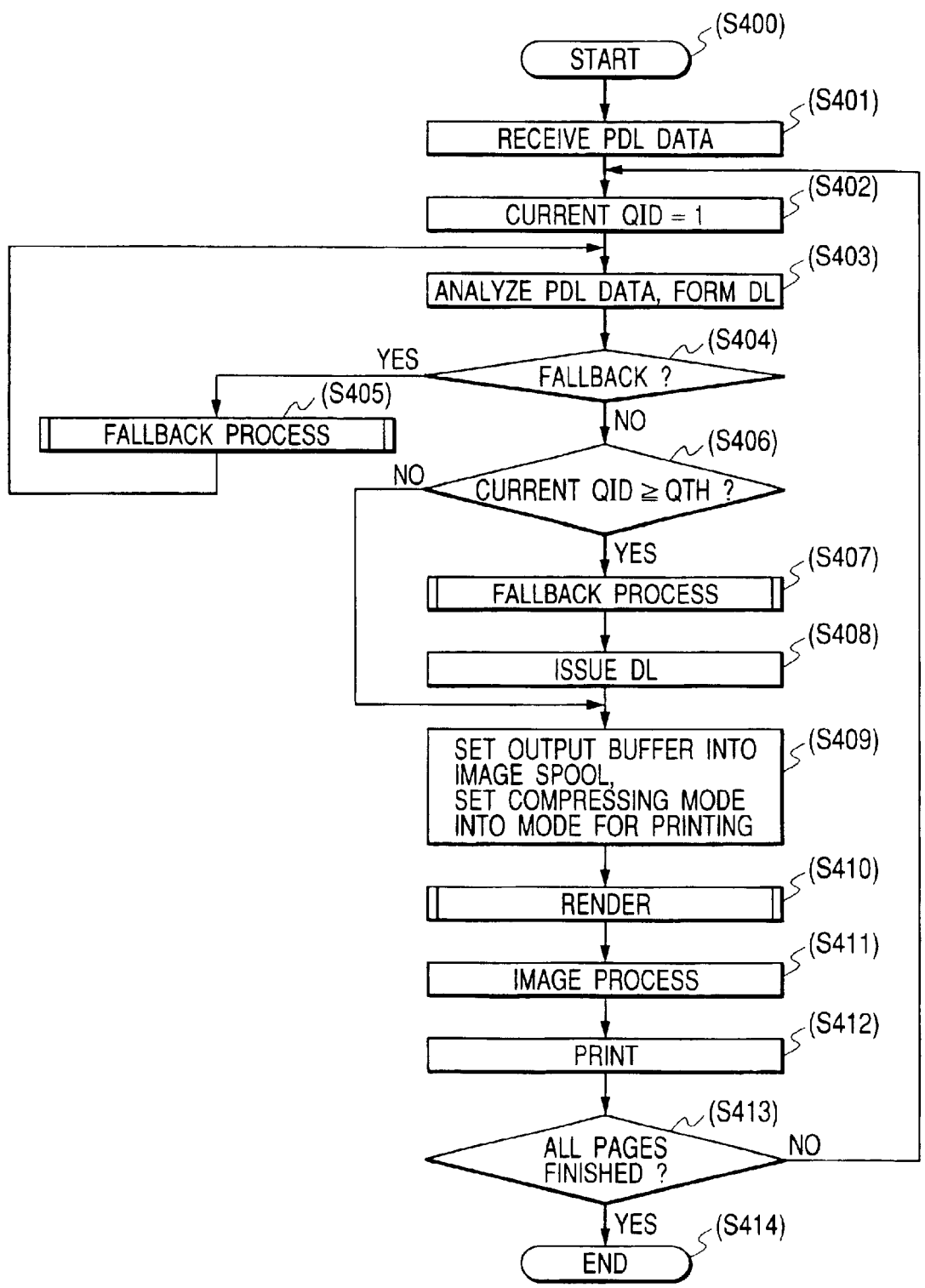
FIG. 3 is a flowchart showing an example of a first data processing procedure in the printing apparatus according to the invention.

FIG. 3 is a flowchart showing an example of a first data processing procedure in the printing apparatus according to the invention and corresponds to a PDL job print processing procedure which is executed by the main-CPU 1 at the time of reception of the PDL job on the basis of the print control program stored in the ROM 4. S400 to S414 denote processing steps, respectively.

When the LBP 1000 receives the PDL job from the external network 3000 (S401), step S402 follows. A variable current QID indicative of the Q table ID which is being set at present is set to "1" and step S403 follows.

In step S403, while an analyzing process of the PDL data is executed by the main-CPU 1, a display list (DL) is formed on the RAM 2 and a DL for printing or a DL for fallback is issued.

When the DL is formed in step S403, ordinarily, the DL for printing is issued at the timing when the DL of one page is formed. However, a size of local memory and a size of table for working of the hard renderer 20 are always checked. If a size of DL which is being formed exceeds the size of local memory and if the size of table for working which is used upon rendering of the DL which is being formed exceeds the size of table installed in the hard renderer 20, the DL for fallback is issued. At this point of time, the processing routine advances to step S404.

In step S404, whether the DL issued in step S403 is the DL for printing or the DL for fallback is discriminated on the basis of a check flag. If it is determined that the issued DL is the DL for fallback, step S405 follows and a fallback process, which will be explained in detail hereinlater, is executed. The processing routine is returned to step S403 and the analysis of the PDL data and the creation of the DL are continued.

After that, if no fallback occurs and the DL of one page is formed, the DL for printing is issued and step S404 follows. In the example of FIG. 9, the DL of the image such that the portion over the position 310 was deteriorated due to the compression and the portion under the position 310 is not deteriorated is formed and the DL for printing is issued.

If it is determined in step S404 that the DL issued in step S403 is the DL for printing, step S406 follows.

In step S406, whether the variable current QID is equal to or larger than the variable QTH or not is discriminated. If it is equal to or larger than QTH, step S407 follows in order to execute again the recompressing step due to the generation of the fallback. A fallback process, which will be explained hereinlater, is executed.

Subsequently, in step S408, a DL of the background image which has been formed during the fallback in step S407 and registered is issued as a DL for printing. As a drawing object, only the background image is included in the DL for printing.

In steps S407 and S408, in the example of FIG. 9, in the case of the portion over the position 310, the image deteriorated due to the compression is rendered, in the case of the portion under the position 310, the image which is not deteriorated is rendered, with respect to the rendered portion over the position 310, the compression which causes the deterioration is again executed to the image deteriorated due to the compression, with respect to the portion under the position 310, the compression which causes the deterioration is again executed to the non-deteriorated image due to the compression, and a DL in which the compression which causes the deterioration has been executed to the whole image is formed and issued. The compression which causes the deterioration is performed twice to the portion over the position 310. The compression which causes the deterioration is performed once to the portion under the position 310. Since, a difference of picture quality between the twice deteriorated image and the once deteriorated image is smaller than that between the deteriorated image and the non-deteriorated image, the boundary in the position 310 becomes inconspicuous.

In step S409, the image output buffer to store the compression image obtained after the rendering is set into an image spool to store the image for printing and, further, a mode to compress a raster image which is formed by the rendering is set to a mode suitable for printing, specifically, to a packet JPEG in which the compression is performed on a packet unit basis.

Subsequently, in step S410, the DL for printing issued in step S403 or S408 is rendered by using the hard renderer 20, the raster image is formed, and thereafter, the compression image is formed. Details of such a process will be explained hereinlater.

In next step S411, the compression image stored in the image spool by the rendering process in step S410 and the compressed attribute bits are transferred to the image processing unit 24 and while the compressed image is decompressed into the raster image, a proper image process is executed in accordance with the attribute bits.

In step S412, image-processed raster image is transferred to the printing unit 9 and printed onto paper.

Subsequently, in step S413, whether the processes of all pages of the PDL job received in step S402 have been finished or not is discriminated. If the processes of all pages have been finished, the printing process of the PDL job is finished (S414). If the PDL data to be processed still remains, the processing routine is returned to step S402 and the current QID is initialized to "1". Thereafter, the analysis of the PDL data and the DL forming process are continued.

The fallback process which is executed in steps S405 and S407 will be described hereinbelow with reference to a flowchart shown in FIG. 4.

Figure 4:
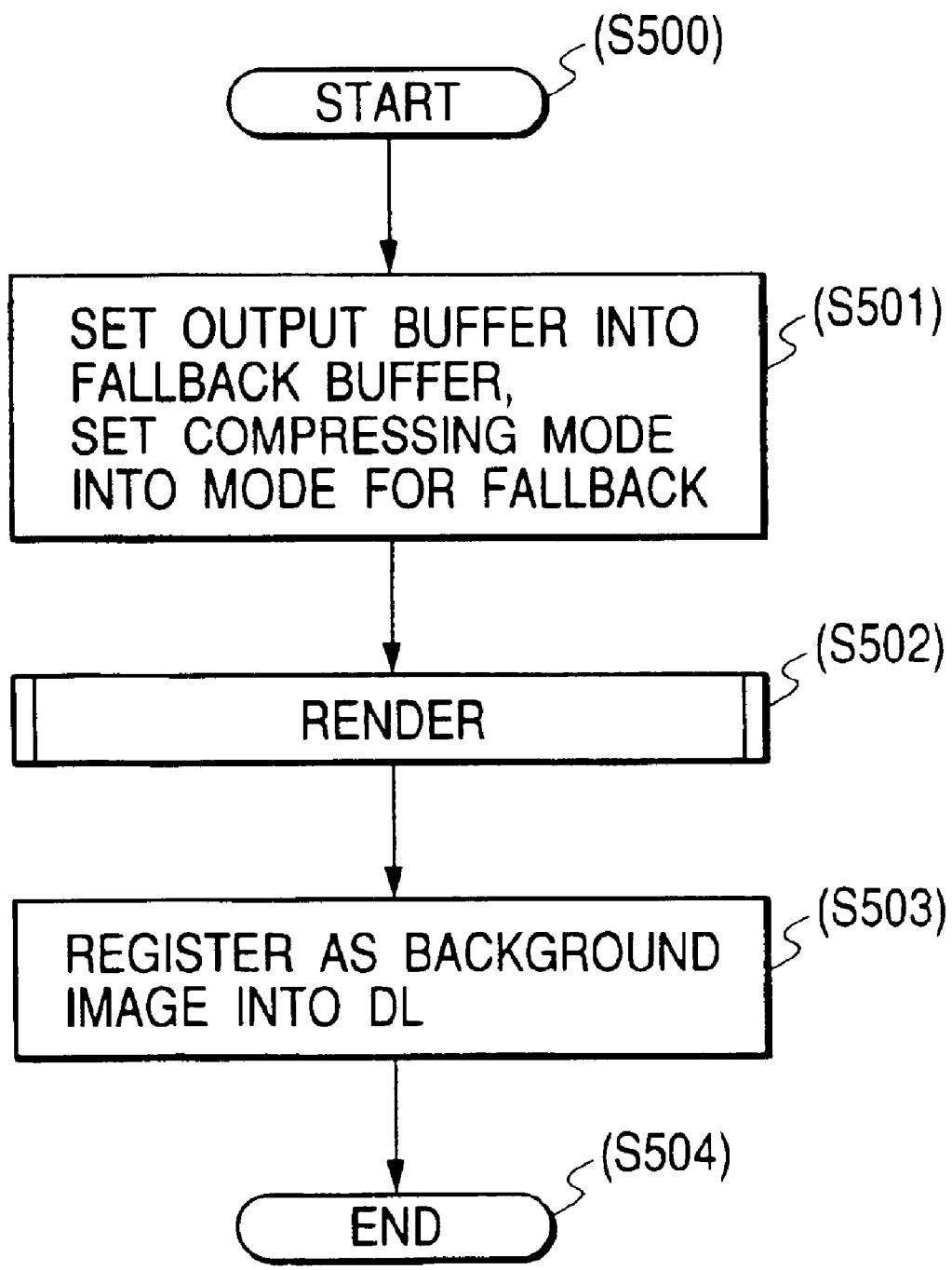
FIG. 4 is a flowchart showing an example of a second data processing procedure in the printing apparatus according to the invention.

FIG. 4 is a flowchart showing an example of a second data processing procedure in the printing apparatus according to the invention and corresponds to a detailed procedure for the fallback process which is executed in steps S405 and S407 shown in FIG. 3. S500 to S504 denote processing steps, respectively.

When the fallback process is started (S500), in step S501, the image output buffer to store the compression image obtained after the rendering is set into a fallback buffer and, further, the mode to compress the raster image formed by the rendering is set into a mode suitable to the fallback, specifically, into a JPEG in which the compression is performed on a scanning line unit basis.

In step S502, the rendering process, for example, the same process as that in step S410 shown in FIG. 3 except for the image output buffer and the compressing mode upon compression is executed.

When the rendering process is finished, in step S503, the compression image stored in the image spool by the rendering process in step S502 and the compressed attribute bits are again registered as a background image into the DL and the fallback process is finished (S504).

The rendering process which is executed in steps S410 and S502 will be described hereinbelow with reference to a flowchart shown in FIG. 5.

Figure 5:
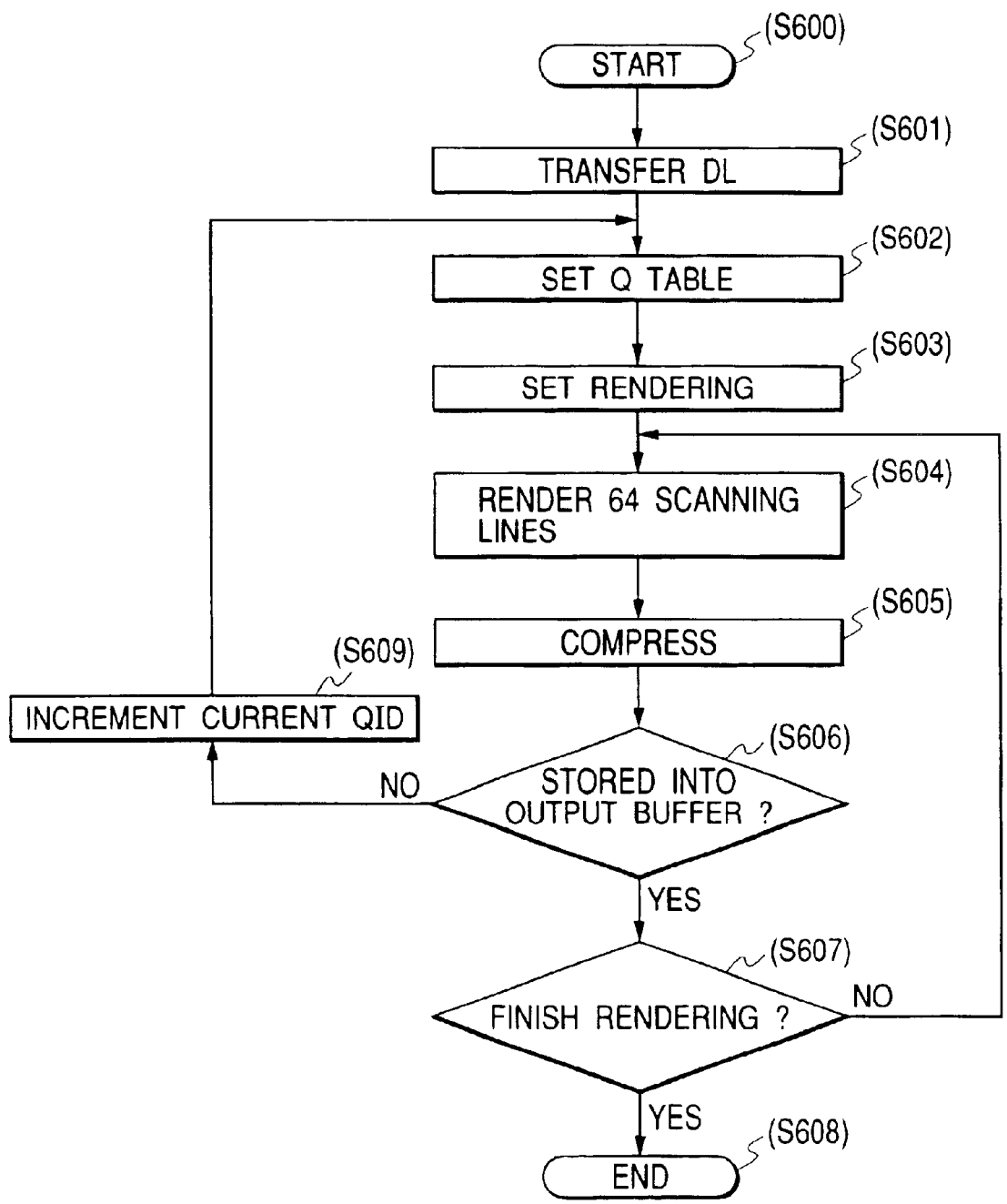
FIG. 5 is a flowchart showing an example of a third data processing procedure in the printing apparatus according to the invention.

FIG. 5 is a flowchart showing an example of a third data processing procedure in the printing apparatus according to the invention and corresponds to a detailed procedure for the rendering process which is executed until the DL obtained in steps S410 and S502 in FIGS. 3 and 4 is rendered and the formed raster image is compressed and stored into the output buffer set in the previous step. S600 to S609 denote processing steps, respectively.

First, when the rendering process is started (S600), the DL issued in step S403 or S408 shown in FIG. 3 is transferred into the local memory 21 on the hard renderer 20 (S601).

In step S602, the Q table of the Q table ID set into the variable current QID is set into the irreversible compressing unit 22.

Subsequently, in step S603, after various initializing processes such as register setting and the like of the hard renderer 20 are executed, a rendering start signal is sent and the rendering of the DL on the local memory 21 is started.

In step S604, while analyzing the DL on the local memory 21, the hard renderer 20 forms the raster image of 64 scanning lines and the attribute bits corresponding to the raster image into the buffer on the local memory. Although the raster image of 64 scanning lines is formed here, the number of scanning lines is shown as an example and, naturally, can be set to an arbitrary number.

In next step S605, the raster image formed in step S604 is transferred to the irreversible compressing unit 22 and compressed on the basis of the Q table set in step S602 and in a preset compressing mode, the formed compression image is stored into the preset image output buffer, the attribute bits formed in step S604 are transferred to the reversible compressing unit 23 and reversibly compressed, and thereafter, the compressed attribute bits are stored into the image output buffer.

When the compression image and the compressed attribute bits are stored into the image output buffer in step S605, whether they could always be stored into the image output buffer or not is discriminated in step S606. If they can be stored into the image output buffer, step S607 follows and whether the rendering of one page has been finished or not is discriminated by checking the number of rendered scanning lines. If it is determined that the rendering of one page has been finished, the rendering process is finished (S608).

If it is determined in step S607 that the rendering of one page is not finished, the processing routine is returned to step S604 and the residual rendering is continued.

If it is determined in step S606 that the compression image or the compressed attribute bits are not stored into the image output buffer, step S609 follows and the value of the variable current QID is incremented. The processing routine is returned to step S602 and the Q table of the Q table ID set into the variable current QID is reset into the irreversible compressing unit 22 and the rendering is restarted.

According to the first embodiment mentioned above, if the raster image compressed by using the Q table of the Q table ID6 of large image deterioration is set to a background at the time of fallback, the fallback is again generated in the foreground image drawing and the compression similar to that of the background image is also performed to the foreground image. Thus, the boundary between the background image and the foreground image becomes inconspicuous as shown in an example of a print result shown in FIG. 6.

Figure 6:
FIG. 6 is a diagram showing an example of a print output for a compression image in the printing apparatus according to the invention.

FIG. 6 is a diagram showing an example of a print output for the compression image in the printing apparatus according to the invention.

In FIG. 6, reference numeral 302 denotes a print output which is obtained by applying the embodiment. In comparison with the print output 301 shown in FIG. 9 which is obtained before the embodiment is applied, it is possible to confirm that the boundary between the background image and the foreground image existing at the position 301 disappears.

(Second Embodiment)

It is also possible to construct the apparatus so as to have a user interface by which the user can set the fixed value of the variable QTH in the first embodiment from the operation panel 1012. Such an embodiment will be described hereinbelow.

Figure 7:
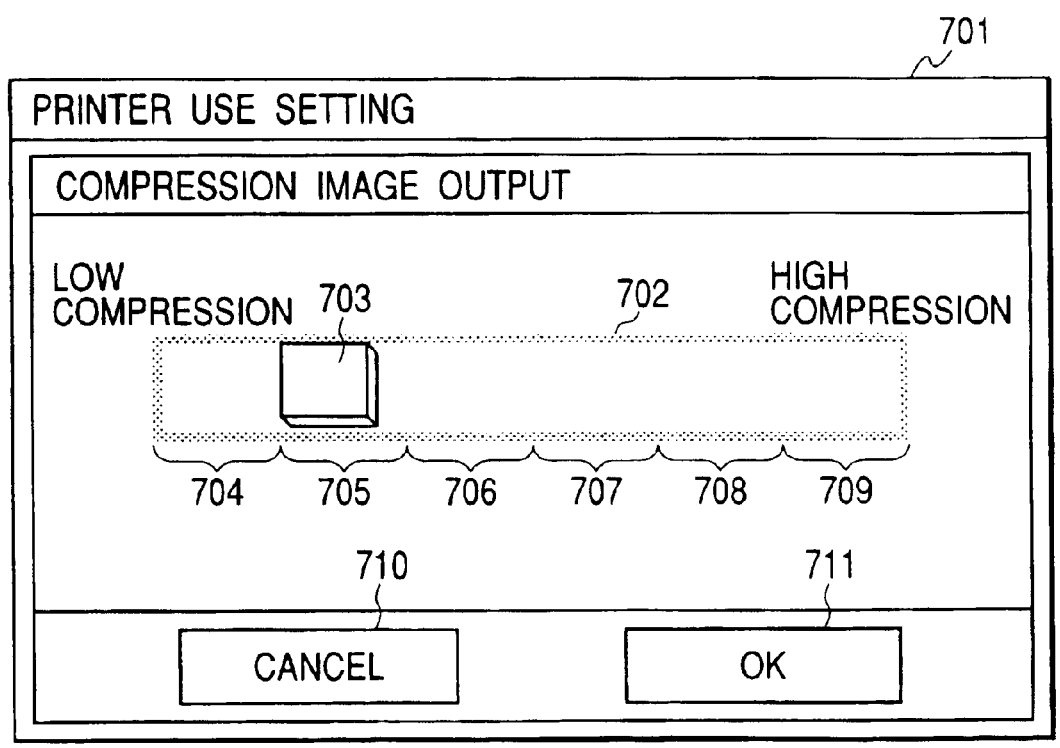
FIG. 7 is a diagram showing an example of a compression image output selecting display screen in a printer use setting in a printing apparatus showing the second embodiment of the invention.

FIG. 7 is a diagram showing an example of a compression image output selecting display screen in a printer use setting in a printing apparatus showing the second embodiment of the invention and shows an example of a display screen which is displayed on an LCD provided for the operation panel 1012 shown in FIG. 2.

In FIG. 7, reference numeral 703 denotes a slider. The user can freely move the slider 703 in a slider movable area 702 by operating the operation panel 1012. The value which is registered into the variable QTH is selected on the basis of the position of the slider 703 in the slider movable area 702.

When the center position of the slider 703 exists in a range 704, if the user clicks an OK button 711, "1" is registered into the variable QTH. When the center position of the slider 703 exists in a range 705, if the user clicks the OK button 711, "2" is registered into the variable QTH. When the center position of the slider 703 exists in a range 706, if the user clicks the OK button 711, "3" is registered into the variable QTH. When the center position of the slider 703 exists in a range 707, if the user clicks the OK button 711, "4" is registered into the variable QTH. When the center position of the slider 703 exists in a range 708, if the user clicks the OK button 711, "5" is registered into the variable QTH. When the center position of the slider 703 exists in a range 709, if the user clicks the OK button 711, "6" is registered into the variable QTH. Reference numeral 710 denotes a cancel button.

From a viewpoint of the user, the smooth image is seen if the value of QTH is small and the recompression by the fallback is performed from a stage of the low image deterioration.

According to the second embodiment mentioned above, the user can select a degree of image deterioration at which the compression of the foreground image is started and more finely adjust the picture quality by the user himself.

(Third Embodiment)

In the first embodiment, when the DL is formed, the fallback process is executed in S405, if it is determined in S406 that a part of the image formed by the fallback exceeds the specific deterioration degree, the rendering of one page is executed during the fallback process in S407, thereafter, the compression which causes deterioration of a similar degree is performed to the whole image, and the DL including only the compression image is formed.

In the third embodiment, the processes in S406 to S408 are omitted and at the time of the rendering process in S410, the DL is checked and whether a part of the image exceeds the specific deterioration degree or not is discriminated. If it is determined that it exceeds the specific deterioration degree, the DL including the image formed by the fallback in S604 of S410 is rendered. In S605 of S410, the compression of the specific deterioration degree is performed to the image which was rendered in S604 and the compression image is outputted to the image output buffer. In S411, the compressed image in the image output buffer is read out and decompressing and imaging processes are performed to the read-out image by the image processing unit. In S412, the processed image is transferred to the engine and printed, so that the embodiment can be realized.

A construction of data processing programs which can be read out by the printing apparatus according to the invention will be described hereinbelow with reference to a memory map shown in FIG. 8.

FIG. 8 is a diagram for explaining the memory map in a storing medium for storing various data processing programs which can be read out by the printing apparatus according to the invention.

Although not shown, information to manage the program group which is stored into the storing medium, for example, version information, an implementor, and the like are stored and there is also a case where information which depends on the OS or the like on the program reading side, for example, icons or the like to identify and display the programs are stored.

Further, data which depends on various programs is also managed in the directory. There is also a case where a program to install the various programs into a computer and, if the installing program has been compressed, a program to decompress it and the like are also stored.

The functions shown in FIGS. 3 to 5 in the embodiment are executed by a host computer on the basis of a program which is installed from the outside. In such a case, the invention is also applied to a case where an information group including the program is supplied to an output apparatus by a storing medium such as CD-ROM, flash memory, FD, or the like or from an external storing medium via a network.

Naturally, the object of the invention is accomplished by a method whereby a storing medium in which program codes of software to realize the functions of the embodiments mentioned above have been recorded as mentioned above is supplied to a system or an apparatus and a computer (or a CPU or an MPU) of the system or apparatus reads out the program codes stored in the storing medium and executes them.

In such a case, the program codes themselves read out from the storing medium realize the novel functions of the invention and the storing medium in which the program codes have been stored constructs the invention.

As a storing medium to supply the program codes, for example, a flexible disk, a hard disk, an optical disk, a magnetooptic disk, a CD-ROM, a CD-R, a magnetic tape, a non-volatile memory card, a ROM, an EEPROM, or the like can be used.

Naturally, the invention incorporates not only a case where a computer executes the read-out program codes, so that the functions of the embodiments are realized but also a case where an OS (Operating System) or the like which is operating on the computer executes a part or all of actual processes on the basis of instructions of the program codes and the functions of the embodiments are realized by those processes.

Further, naturally, the invention incorporates a case where the program codes read out from the storing medium are written into a memory provided for a function expanding board inserted into a computer or a function expanding unit connected to a computer and, thereafter, a CPU or the like provided for the function expanding board or the function expanding unit executes a part or all of actual processes on the basis of instructions of the program codes and the functions of the embodiments are realized by those processes.

The invention is not limited to the foregoing embodiments but many various modifications (including an organic combination of the embodiments) are possible on the basis of the spirit of the invention and are not excluded from the purview of the invention.

Although various examples and embodiments of the invention have been shown and described above, it would obviously been understood by those skilled in the art that the spirit and scope of the invention are not limited to the specific explanation in the specification but the following embodiments are also naturally incorporated. The embodiments 1 to 10 will be described hereinbelow.

(Embodiment 1)

A printing apparatus for compressing raster image information which is formed in accordance with print information which is inputted, using the compressed image as a background image, and drawing a foreground image thereon, comprising: image deterioration degree detecting means (for example, step S406 shown in FIG. 3) for detecting a degree of image deterioration due to the compression of said compressed background image; and recompressing means (for example, step S407 shown in FIG. 3) for performing a compressing process which causes image deterioration of a degree similar to the image deterioration detected by the image deterioration degree detecting means to the whole image after the foreground image was drawn.

(Embodiment 2)

A printing apparatus according to Embodiment 1, further comprising recompressing means (for example, step S407 shown in FIG. 3) for, if the image deterioration degree detected by the image deterioration degree detecting means is equal to or larger than a predetermined value, performing the compression which causes the image deterioration of a degree similar to the image deterioration detected by the image deterioration degree detecting means to the whole image after the foreground image was drawn.

(Embodiment 3)

A printing apparatus according to Embodiment 1, further comprising: rendering means (for example, step S410 shown in FIG. 3) for interpreting an intermediate language and forming a raster image; and fallback means for, if the intermediate language cannot be rendered in a lump by using the rendering means, rendering the intermediate language halfway by the rendering means, compressing the formed raster image, and subsequently adding the compression image again as a background image to the intermediate language, wherein the recompressing means is constructed by the fallback means.

(Embodiment 4)

A printing apparatus according to Embodiment 2, further comprising image deterioration degree designating means for allowing the user to designate the image deterioration degree of the background image which is compressed again by the recompressing means.

(Embodiment 5)

A control method in a printing apparatus for compressing raster image information which is formed in accordance with print information which is inputted, using the compressed image as a background image, and drawing a foreground image thereon, comprising: an image deterioration degree detecting step (for example, step S406 shown in FIG. 3) of detecting a degree of image deterioration due to the compression of said compressed background image; and a recompressing step (for example, step S407 shown in FIG. 3) of performing a compressing process which causes image deterioration of a degree similar to the image deterioration detected by the image deterioration degree detecting step to the whole image after the foreground image was drawn.

(Embodiment 6)

A control method according to Embodiment 5, further comprising a recompressing step (for example, step S407 shown in FIG. 3) of, if the image deterioration degree detected by the image deterioration degree detecting step is equal to or larger than a predetermined value, performing the compression which causes the image deterioration of a degree similar to the image deterioration detected by the image deterioration degree detecting step to the whole image after the foreground image was drawn.

(Embodiment 7)

A control method according to Embodiment 5, further comprising: a rendering step (for example, step S410 shown in FIG. 3) of interpreting an intermediate language and forming a raster image; and a fallback step (for example, step S407 shown in FIG. 3) of, if the intermediate language cannot be rendered in a lump by using the rendering step, rendering the intermediate language halfway by the rendering step, compressing the formed raster image, and subsequently adding the compression image again as a background image to the intermediate language, wherein the recompressing step is constructed by the fallback step.

(Embodiment 8)

A control method according to Embodiment 5, further comprising an image deterioration degree designating step of allowing the user to designate the image deterioration degree of the background image which is compressed again by the recompressing step (for example, it is designated via the user interface shown in FIG. 7).

(Embodiment 9)

A computer-readable storing medium which stores a program for realizing a control method according to any one of Embodiments 5 to 8.

(Embodiment 10)

A program for realizing a control method according to any one of Embodiments 5 to 8.

According to the foregoing Embodiments, the difference of the picture quality between the foreground image and the background image is reduced and a good print result in which the boundary between the foreground image and the background image is inconspicuous can be obtained.

As described above, according to the embodiments of the invention, in the printing apparatus for compressing the raster image information which is formed in accordance with the print information which is inputted, using the compressed image as a background image, and drawing the foreground image thereon, after the foreground image was drawn, the degree of the image deterioration due to the compression of the compressed background image is detected and the compressing process which causes the image deterioration of the degree similar to the detected image deterioration is performed to the whole image, so that an effect such that the difference of the picture quality between the foreground image and the background image is reduced and a good print result in which the boundary between the foreground image and the background image is inconspicuous can be obtained. It is also possible to provide the printing apparatus which decreases the difference of the picture quality between the deteriorated image and the non-deteriorated image and can obtain a good print result in which the boundary between the deteriorated image and the non-deteriorated image is inconspicuous.

What is claimed is:

1. A printing apparatus comprising:

a discriminating unit adapted to discriminate whether or not an image includes a deteriorated image and detect a degree of deterioration in a background portion of the image;

a processing unit adapted to render, if said discriminating unit discriminates that the image includes a deteriorated image, the image based on the deteriorated image and a non-deteriorated image included in the image, to compress the rendered image causing deterioration to the rendered image; wherein the image, including a foreground portion is subjected to the compression producing an overall degree of deterioration based on the degree of deterioration detected in the background portion, and to save the compressed image; and a printing unit adapted to print the image processed by said processing unit.

2. An apparatus according to claim 1, wherein the deterioration includes deterioration due to compression.

3. An apparatus according to claim 1, wherein when a display list is formed, if said discriminating unit discriminates that the image includes a deteriorated image, said processing unit decompresses the image including the deteriorated image and performs the compression causing deterioration to the decompressed image, thereby deteriorating the image.

4. An apparatus according to claim 1, wherein upon rendering, if said discriminating unit discriminates that the image includes a deteriorated image, said processing unit decompresses the image including the deteriorated image and performs the compression causing deterioration to the decompressed image, thereby deteriorating the image.

5. A printing method comprising:

a discriminating step of discriminating whether or not an image includes a deteriorated image;

a processing step of deteriorating the image if said discriminating step discriminates that the image includes a deteriorated image; and a printing step of printing the image processed in said processing step, wherein, if said discriminating step discriminates that the image includes a deteriorated image, said processing step decompresses the image including the deteriorated image and performs compression on the decompressed image causing deterioration to the decompressed image, thereby deteriorating the image.

6. A method according to claim 5, wherein the deterioration includes deterioration due to compression.

7. A printing method comprising:

a discriminating step of discriminating whether or not an image includes a deteriorated image;

a processing step of deteriorating the image if said discriminating step discriminates that the image includes a deteriorated image; and a printing step of printing the image processed in said processing step, wherein, when a display list is formed and if said discriminating step discriminates that the image includes a deteriorated image, said processing step decompresses the image including the deteriorated image and compresses the decompressed image causing the deterioration to the decompressed image, thereby deteriorating the image.

8. A printing method comprising:

a discriminating step of discriminating whether or not an image includes a deteriorated image;

a processing step of deteriorating the image if said discriminating step discriminates that the image includes a deteriorated image; and a printing step of printing the image processed in said processing step, wherein upon rendering, if said discriminating step discriminates that the image includes a deteriorated image, said processing step decompresses the image including the deteriorated image and compresses the decompressed image causing the deterioration to the decompressed image, thereby deteriorating the image.

9. A computer-readable storage medium for storing a program, said program comprising:

code for a discriminating step of discriminating whether or not an image includes a deteriorated image;

a processing step of deteriorating the image if said code for a discriminating step discriminates that the image includes a deteriorated image; and code for a printing step of printing the image processed by said code for a processing step, wherein, if said code for a discriminating step discriminates that the image includes a deteriorated image, said code for a processing step decompresses the image including the deteriorated image and performs compression on the decompressed image causing deterioration to the decompressed image, thereby deteriorating the image.

10. A program according to claim 9, wherein the deterioration includes deterioration due to compression.

11. A computer-readable storage medium for storing a program, said program comprising:

code for a discriminating step of discriminating whether or not an image includes a deteriorated image;

code for a processing step of deteriorating the image if said code for a discriminating step discriminates that the image includes a deteriorated image; and code for a printing step of printing the image processed by said code for a processing step, wherein, when a display list is formed and if said code for a discriminating step discriminates that the image includes a deteriorated image, said code for a processing step decompresses the image including the deteriorated image and compresses the decompressed image causing the deterioration to the decompressed image, thereby deteriorating the image.

12. A computer-readable storage medium for storing a program, said program comprising:

code for a discriminating step of discriminating whether or not an image includes a deteriorated image;

code for a processing step of deteriorating the image if said code for a discriminating step discriminates that the image includes a deteriorated image; and code for a printing step of printing the image processed by said code for a processing step, wherein upon rendering, if said code for a discriminating step discriminates that the image includes a deteriorated image, said code for a processing step decompresses the image including the deteriorated image and compresses the decompressed image causing the deterioration to the decompressed image, thereby deteriorating the image.

* * * * *